United States Patent

[11] 3,541,939

| [72] | Inventor | Leonard F. Kamp<br>Rochester, New York |
|---|---|---|
| [21] | Appl. No. | 685,618 |
| [22] | Filed | Nov. 24, 1967 |
| [45] | Patented | Nov. 24, 1970 |
| [73] | Assignee | Eastman Kodak Company<br>Rochester, New York<br>a corporation of New Jersey |

[54] CARTRIDGE FOR DISPENSING SLIDE TRANSPARENCY UNITS
9 Claims, 4 Drawing Figs.

[52] U.S. Cl.................................................. 95/30, 95/13; 250/68; 353/113
[51] Int. Cl..................................................... G03b 19/10, G03b 17/52
[50] Field of Search.......................................... 95/19, 13, 30; 353/113, 116; 355/10; 250/66, 68

[56] References Cited
UNITED STATES PATENTS
| 1,557,085 | 10/1925 | Piller.......................... | 95/30 |
| 1,823,321 | 9/1931 | Hammond..................... | 95/30 |
| 2,463,878 | 3/1949 | Johnson....................... | 95/30X |
| 2,873,658 | 2/1959 | Land............................ | 95/13 |
| 3,412,244 | 11/1968 | Sherwood..................... | 250/68 |

Primary Examiner—John M. Horan
Assistant Examiner—Robert P. Greiner
Attorneys—Robert W. Hampton and Gary D. Fields ABSTRACT: A cartridge for sequentially supplying unexposed slide transparency units to an exposure chamber of a camera having a reciprocating mechanism for withdrawing and transporting the units from the cartridge. The cartridge includes a housing having support members defining an opening for entry of the camera reciprocating mechanism into the bottom section of the cartridge, and an exit slot for the film units in one end of the cartridge. A pressure pad rides on units in the housing and is biased to urge the slide units towards the exit slot. In an alternative embodiment, the slide units are urged towards the exit slot by a spring-driven plunger included in the camera structure.

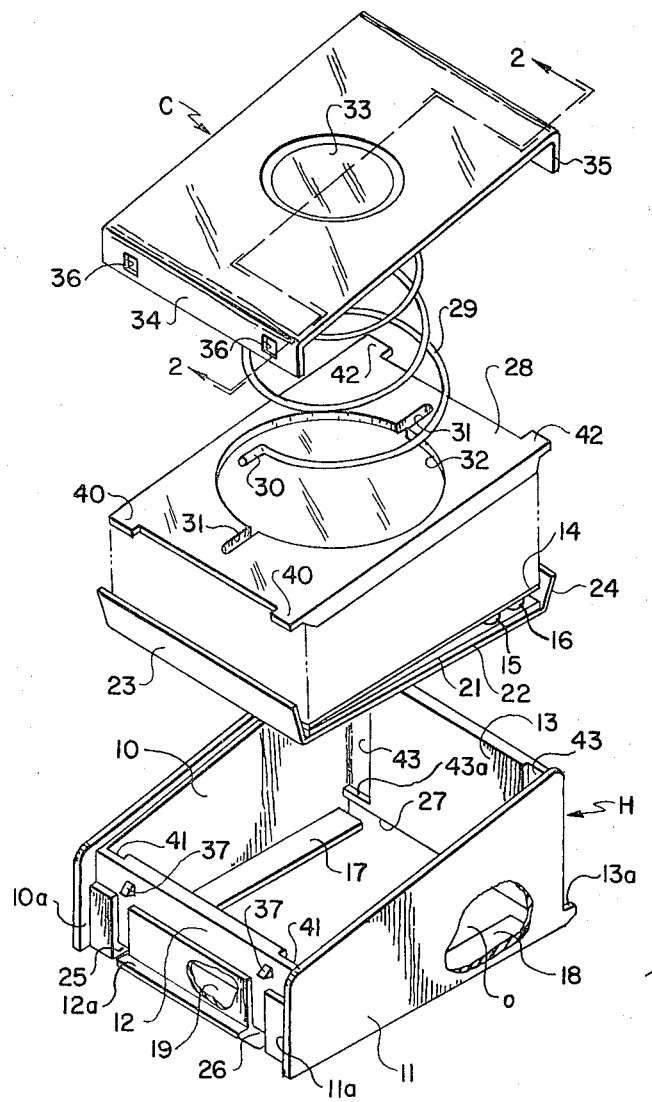
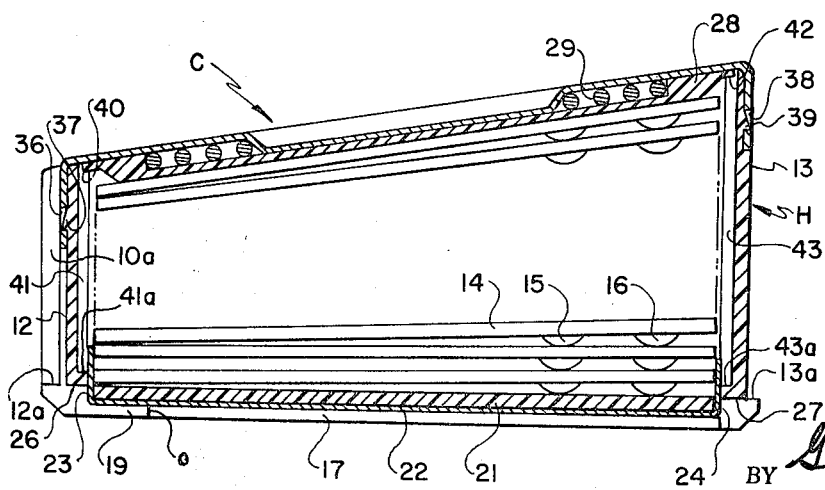
FIG. 1
FIG. 2
LEONARD F. KAMP
INVENTOR
BY Gary D. Fields
Robert W Hampton Patented Nov. 24, 1970
3,541,939
Sheet 2 of 2
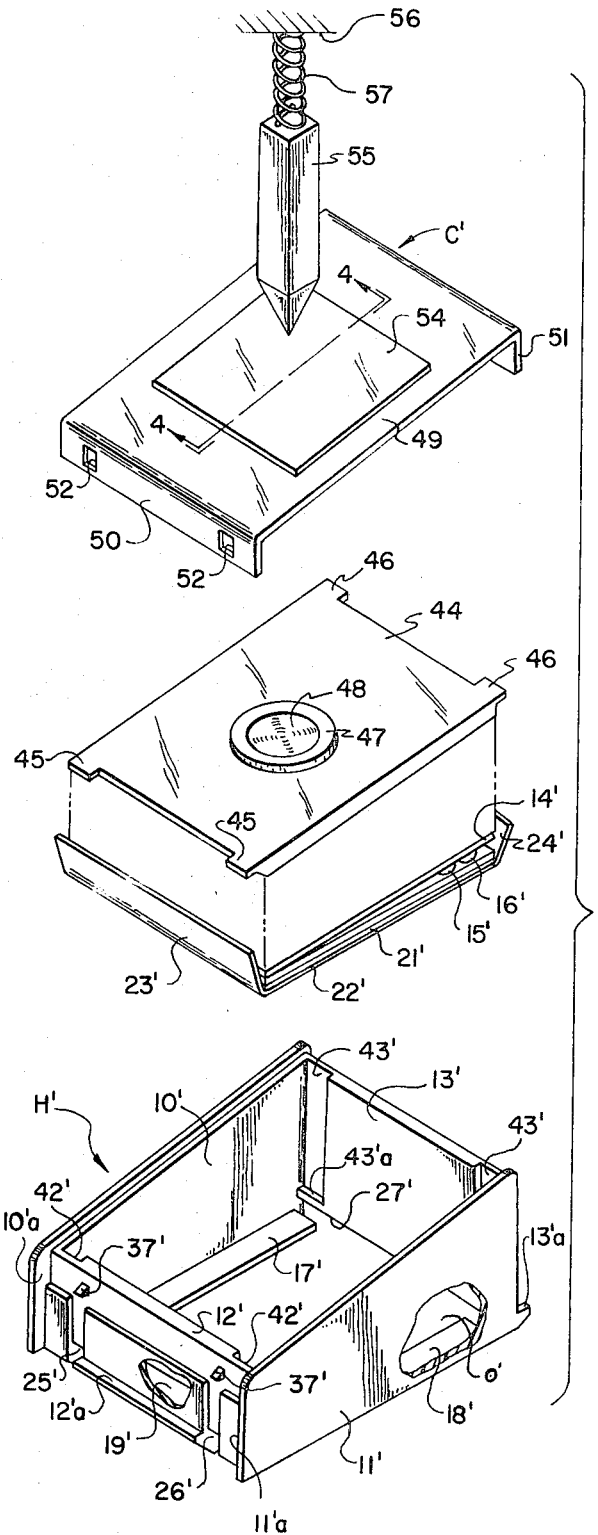
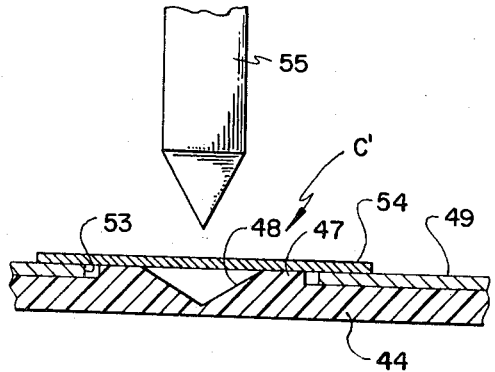
FIG.4
FIG.3
LEONARD F. KAMP
INVENTOR.
BY Gary D. Fields
Robert W Hampton 3,541,939

CARTRIDGE FOR DISPENSING SLIDE TRANSPARENCY UNITS

CROSS-REFERENCE TO RELATED APPLICATIONS

The cartridge of this invention could be utilized in the camera disclosed in the copending application of Hubert Nerwin, Ser. No. 675,597, for supplying slide transparency units of the type disclosed in the copending application of Hubert Nerwin, Ser. No. 675,608, both filed Oct. 16, 1967.

BACKGROUND OF THE INVENTION

1. Field of the Invention

This invention relates to a cartridge or magazine for slide transparency units, and more particularly to such a cartridge for supplying unexposed transparency units to a camera for exposure and development therein.

2. Description of the Prior Art

A film pack is disclosed in U.S. Pat. No. 3,225,671 to Friedman which is adapted to provide a plurality of slide transparency units within a camera, each transparency unit having a separate leader for transporting the unit from the cartridge to a processing chamber within the camera. The film pack there disclosed is not usable, however, within a camera having a slide or pusher for advancing the transparency units.

SUMMARY OF THE INVENTION

In one embodiment of the invention, a boxlike housing is provided for supporting a plurality of slide transparency units in a stack. The transparency units are urged toward an exit slot by a spring between the top of the housing and a pressure pad positioned above the units.

In an alternative embodiment, a simplified cartridge is provided wherein the camera is modified to incorporate a spring-urged plunger which perforates the top of the cartridge when the cartridge is inserted in the camera and which thereafter urges the transparency units toward the exit slot. In each embodiment, the transparency units are sequentially removed from the cartridge by a claw mechanism within the camera. After all of the units have been so removed from the cartridge, the pressure pad in the cartridge is supported above the exit slot in guide means so that the pad itself cannot be engaged by the claw mechanism.

Additional features of this invention will become apparent from the description which follows, taken in conjunction with the accompanying drawings.

BRIEF DESCRIPTION OF THE DRAWINGS

FIG. 1 is an exploded view of a cartridge constructed in accordance with one embodiment of this invention, with certain parts broken away for clarity of illustration;

FIG. 2 is an offset longitudinal section, taken along line 2–2 of FIG. 1, showing the arrangement of the transparency units within the cartridge;

FIG. 3 is an exploded view, similar to FIG. 1, showing the construction of an alternative cartridge engageable by a spring-urged plunger within a camera; and FIG. 4 is a fragmentary section, taken along line 4–4 of FIG. 3, showing further details of the alternative cartridge cover and its position relative to the plunger as the cartridge is inserted in the camera.

DESCRIPTION OF THE PREFERRED EMBODIMENTS

In accordance with this invention, a cartridge is provided, as shown in FIGS. 1 and 2, which has a generally boxlike housing H with spaced trapezoidal sidewalls 10 and 11 interconnected by a relatively low end wall 12 and a relatively high end wall 13. Transparency units 14 are arranged in a stack within the cartridge and have spaced pods 15 and 16 containing developing agents accommodated by the additional space provided by high end wall 13. The lower portions of sidewalls 10 and 11 terminates in an inwardly extending flanges 17 and 18, respectively, and the lower portion of end wall 12 terminates in an inwardly extending flange 19, as seen in FIG. 2. Flanges 17, 18, and 19 define an opening O in housing H through which a reciprocative claw mechanism in the camera can extend to sequentially transport the transparency units from the cartridge for subsequent exposure and development. Additionally, these flanges support the transparency units on a blank 21 which is conveniently provided with a paper or plastic sheet or backing 22 having upturned ends 23 and 24 which serve as light locks prior to insertion of the cartridge into a camera. Thus, end 23 extends between one edge of transparency units 14 and spaced notches 25 and 26, as best seen in FIG. 1. Notches 25 and 26 are arranged as shown to provide clearance for corresponding end portions of the camera claw mechanism, such as that disclosed in the copending application of Hubert Nerwin, Ser. No. 675,597, filed Oct. 16, 1967, while the claw mechanism sequentially engages the transparency units to remove them from the cartridge. Similarly, the opposite end 24 extends between an opposite edge of transparency units 14 and an exit slot 27 in end wall 13, through which slot the transparency units are sequentially removed from the cartridge by the camera claw mechanism. In operation, the camera claw mechanism removes blank 21 and backing 22, including ends 23 and 24, on its first stroke, and then moves transparency units 14 sequentially from the bottom of the stack, as viewed in FIGS. 1 and 2, through exit slot 27, and out of the cartridge for exposure and development.

When the cartridge is inserted into a camera, proper alignment of exit slot 27 with a corresponding slot in the camera is provided by flanges 12a and 13a which engage suitable abutments in the camera opening. Furthermore, the cartridge cannot be inserted into the camera backwards because ribs 10a and 11a, formed as extensions of side walls 10 and 11, respectively, must engage suitable slots for receiving them at the appropriate end of the camera opening.

A generally rectangular pressure pad 28 is positioned within the cartridge above transparency units 14 and is urged toward the transparency units by a coil spring 29 having an end 30 extending into one of two notches 31 in a circular opening 32 in the pressure pad. The opposite end of spring 29 engages a depression 33 in cover C. Opposite ends of cover C terminate in depending flanges 34 and 35, in each of which is provided a pair of spaced openings such as openings 36 of flange 34, which interlock with lugs 37 on end wall 12 when the cartridge is assembled, and openings 38 of flange 35, which interlock with lugs 39 on end wall 13, as seen in FIG. 2. Thus, the transparency units can be easily placed in the cartridge from the upper end thereof and the cover then snapped in place.

Pressure pad 28 has a pair of ears 40 extending from one end, which engage spaced guide slots 41 in end wall 12, and a pair of ears 42 extending from the opposite end, which similarly engage guide slots 43 in end wall 13. Advantageously, after the last transparency unit has been transported from the cartridge into an exposure position within the camera, pressure pad 28 will be supported by its four spaced ears 40 and 42 on the ledges 41a and 43a at the bottom of slots 41 and 43, respectively, so that the claw mechanism within the camera cannot engage the pressure pad.

A simplified version of the cartridge is illustrated in FIGS. 3 and 4 wherein the spring means for holding the transparency units in an appropriate position is provided within the camera rather than in the cartridge. Thus, a generally boxlike housing H' is provided having spaced sidewalls 10' and 11' interconnected by a relatively low end wall 12' and a relatively high end wall 13'. The transparency units are supported by flanges 17', 18', and 19', respectively, extending inwardly from side walls 10' and 11' and end wall 12', and defining an opening O' similar to opening O in FIGS. 1 and 2. Transparency units 14', having spaced pods 15' and 16', are supported on a blank 21' having a paper or plastic backing or sheet 22' which terminates in upwardly extending ends 23' and 24'. As in the previous embodiment, end 23' serves as a light lock between spaced slots 25' and 26' in end wall 12' and one edge of the transparency units 14', and end 24' serves as a light lock between the opposite ends of transparency units 14' and exit slot 27'. Also as in the previous embodiment, blank 21' and backing 22', including ends 23' and 24', are removed by the first stroke of the camera claw mechanism, after which transparency units 14' are sequentially removed as previously described. When the cartridge is inserted into a camera, proper alignment of exit slot 27' with a corresponding slot in the camera is provided by flanges 12'a and 13'a which engage suitable abutments in the camera opening. Furthermore, the cartridge cannot be inserted into the camera backwards because ribs 10'a and 11'a, formed as extensions of sidewalls 10' and 11', respectively, must engage suitable slots for receiving them at the appropriate end of the camera opening.

A pressure pad 44 is provided above the transparency units and has a pair of outwardly extending spaced ears 45 at one end, which are guided by spaced slots 42' in end wall 12', and a pair of spaced ears 46 extending from the opposite end, which are similarly guided by spaced slots 43' in end wall 13'. The center of pressure pad 44 is provided with a circular boss 47 having a conical depression 48 therein for engagement with a pressure means described below.

Housing H' is provided with a cover C' which includes a lid 49 having depending flanges 50 and 51 with spaced openings therein, such as openings 52 in flange 50 adapted to engage lugs 37' on end wall 12'. Cover C' has a central opening 53 covered by a frangible sheet 54 which prevents light from entering the cartridge prior to insertion of the cartridge in a camera. As the cartridge is inserted in a camera, however, sheet 54 is engaged by plunger 55 which is urged away from a support 56 on the camera by a spring 57. As the cartridge is pushed into place, the pointed end of the plunger will perforate sheet 54 and engage depression 48 of boss 47, urging pressure pad 44 and transparency units 14' toward flanges 17' and 18'. Alternatively, means could be provided on the camera for retracting the plunger during insertion of the cartridge and for releasing it after the camera door is closed. Advantageously, the pointed end of plunger 55 should be three- or four-sided so that it perforates sheet 54 when only limited pressure is applied thereto. As in the previous embodiment, after the last transparency unit has been transported from the cartridge, pressure pad 44 will be supported by its four spaced ears 45 and 46 upon ledges at the bottom of slots 42' and 43', such as ledges 43'a above exit slot 27', so that the pressure pad will not be engaged by the claw mechanism of the camera.

From the foregoing, it can be seen that the novel features of this invention are significant. A cartridge has been provided, for use with slide transparency units, which is of simple construction. The cartridge is provided with a pressure pad, guided by slots in the cartridge housing, for positioning the transparency units. After the last unit has been removed from the cartridge, the pressure pad is held above the exit slot in the cartridge housing by ears on the pressure pad. In one embodiment, a spring means is provided within the cartridge for urging the transparency units toward the exit slot. In an alternative embodiment, the spring means is provided within the camera, thereby, simplifying the cartridge structure.

The invention has been described in detail with particular reference to preferred embodiments thereof, but it will be understood that variations and modifications can be effected within the spirit and scope of the invention as described hereinabove and as defined in the appended claims.

I claim:

1. A cartridge for supplying to a camera a stack of film units which are adapted to be exposed and developed within the camera, the camera having a reciprocative mechanism adapted to sequentially transport the film units from said cartridge, said cartridge comprising:
   a housing including:
      two spaced sidewalls;
      two spaced end walls interconnecting said sidewalls;
      support means connected to at least one of said walls for supporting a stack of film units received in said cartridge and defining an opening in said housing through which the reciprocative mechanism in the camera is adapted to extend;
   means defining an exit slot in one of said end walls adjacent to said opening through which the received film units are adapted to be sequentially transported from said cartridge for exposure and development in the camera; and
   guide means in one of said walls extending toward said support means;
   a pressure pad engageable with said guide means and adapted to be resiliently urged toward said support means so that the film units are held against said support means for sequential movement through said exit slot; and
   a cover opposite and spaced from said opening and engageable with said walls to form a light-tight closure wherein said guide means terminates at a distance from said exit slot so that said pressure pad cannot be moved through said exit slot after the last film unit has been moved therethrough.

2. A cartridge as set forth in claim 1 wherein said guide means includes means defining a guide slot in each of at least two of said walls extending from said cover toward said support means; and said pressure pad includes ears extending outwardly from said pad engageable with and movable along respective guide slots.

3. A cartridge as set forth in claim 2 wherein said side walls are trapezoidal so that said housing will accommodate pods containing developing agents attached to the film units received in said cartridge.

4. A cartridge as set forth in claim 1 including:
   a pair of spaced lugs extending from one of said cover and an end wall; and
   means defining a pair of spaced openings in the other of said cover and said end wall having edge portions engageable with said lugs for interlocking said cover and said housing.

5. A cartridge as set forth in claim 1 including a spring within said cartridge having two ends, one end engageable with said pressure pad and the other end engageable with said cover to urge said pressure pad toward said support means.

6. A cartridge as set forth in claim 5 further including:
   means defining a notch in said pressure pad for receiving said one end of said spring; and
   means defining a recess in said cover for supporting said other end of said spring.

7. A cartridge as set forth in claim 1 the camera further having a movable member adapted to be resiliently urged toward said cartridge for engagement with said cover and said pressure pad when said cartridge is placed in operative relation to the camera, wherein said cover includes:
   means defining a central opening; and
   a frangible member over said central opening adapted to be broken by the movable member in the camera when said cartridge is placed in operative relation to the camera so that said pressure pad will then be resiliently urged by the movable member toward said support means.

8. A cartridge as set in claim 7 wherein said pressure pad includes a centrally mounted boss adapted to be engaged by the movable member in the camera.

9. A cartridge for supplying to a camera a stack of slide transparency units which are adapted to be exposed and developed within the camera, the camera having a reciprocative mechanism adapted to sequentially transport the transparency units from said cartridge, said cartridge comprising:
   a housing including:
      two spaced substantially trapezoidal sidewalls, each having a first end portion and a second end portion opposite and substantially parallel with said first end portion, said first end portion of each sidewall exceeding in length said second end portion of that sidewall so that said housing can accommodate between said sidewalls a stack of slide transparency units each of which is thicker at one end than at its opposite end;

a first end wall interconnecting said first end portions of said sidewalls;

a second end wall interconnecting said second end portions of said sidewalls;

a flange extending inwardly from each of said sidewalls and said second end wall for supporting a stack of slide transparency units received in said cartridge and defining an opening in said housing through which the reciprocative mechanism in the camera is adapted to extend;

means defining an exit slot in said first end wall adjacent to said opening through which the received transparency units are adapted to be sequentially transported from said cartridge for exposure and development in the camera;

means defining a first pair of spaced guide slots in said first end wall extending toward said exit slot; and means defining a second pair of spaced guide slots in said second end wall extending toward said second end wall flange;

a pressure pad including:
  a flat plate having a first end portion and a second end portion opposite said first end portion;
  a first pair of spaced ears extending outwardly from said first end portion of said plate and engageable with said first pair of guide slots;
  a second pair of spaced ears extending outwardly from said second end portion of said plate and engageable with said second pair of guide slots; and a cover including:
  a substantially flat body portion having a first end portion and a second end portion opposite said first end portion; and
  a flange depending from one of said end portions of said body portion and adapted to overlie and interlock with a portion of one of said end walls.